United States Patent
Li et al.

(10) Patent No.: US 12,475,316 B2
(45) Date of Patent: Nov. 18, 2025

(54) MONO-LINGUAL LANGUAGE MODELS USING PARALLEL DATA

(71) Applicant: International Business Machines Corporation, Armonk, NY (US)

(72) Inventors: Yulong Li, Westchester, NY (US); Masayasu Muraoka, Bunkyo-ku (JP); Graeme William Blackwood, White Plains, NY (US); Michele Merler, New York, NY (US); Yang Zhao, Tokyo (JP); Bishwaranjan Bhattacharjee, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 238 days.

(21) Appl. No.: 18/351,620

(22) Filed: Jul. 13, 2023

(65) Prior Publication Data
US 2025/0021760 A1   Jan. 16, 2025

(51) Int. Cl.
*G06F 40/284*   (2020.01)
*G06F 40/40*   (2020.01)

(52) U.S. Cl.
CPC ............ *G06F 40/284* (2020.01); *G06F 40/40* (2020.01)

(58) Field of Classification Search
None
See application file for complete search history.

(56) References Cited

U.S. PATENT DOCUMENTS

2009/0326916 A1* 12/2009 Gao ................ G06F 40/44
                                                              704/4
2010/0228693 A1*  9/2010 Dawson ............ G06N 5/022
                                                              707/769
(Continued)

FOREIGN PATENT DOCUMENTS

CN   111078889 B   1/2021
CN   113657119 A   11/2021
(Continued)

OTHER PUBLICATIONS

Tang, et al., "VIDLANKD: Improving Language Understanding via Video-Distilled Knowledge Transfer," Advances in Neural Information Processing Systems, 34, pp. 24468-24481, arXiv:2107.02681v2 [cs.CL] Oct. 19, 2021.
(Continued)

*Primary Examiner* — Peter Vincent Agustin
(74) *Attorney, Agent, or Firm* — Amin, Turocy & Watson, LLP

(57) ABSTRACT

Systems, computer-implemented methods, and computer program products to facilitate improving a mono-lingual language model using pre-trained models and parallel data are provided. According to an embodiment, a system can comprise a processor that executes components stored in memory. The computer executable components can comprise a training component that can use a first language model to improve a mono-lingual second language model through mask language modeling (MLM) training and contrastive learning. The computer executable components can comprise a data component that can collect parallel data for the first language model and the mono-lingual second language model. The computer executable components can comprise a tokenizing component that can tokenize the parallel data for the first language model and the mono-lingual second language model. The computer executable components
(Continued)

components can comprise an alignment component that can create an alignment of the tokenized parallel data.

20 Claims, 10 Drawing Sheets

(56) References Cited

U.S. PATENT DOCUMENTS

| | | | | |
|---|---|---|---|---|
| 2013/0132064 A1* | 5/2013 | Hwang | ............... | G06F 40/53 |
| | | | | 704/2 |
| 2013/0325442 A1* | 12/2013 | Dahlmeier | ........... | G06F 40/274 |
| | | | | 704/9 |
| 2021/0375262 A1* | 12/2021 | Wick | .................. | G10L 15/063 |
| 2022/0171941 A1* | 6/2022 | Ouyang | ............... | G06F 40/58 |
| 2022/0292269 A1 | 9/2022 | Niu et al. | | |
| 2022/0318255 A1* | 10/2022 | Fei | .................. | G06F 16/24578 |
| 2023/0080904 A1* | 3/2023 | Han | ..................... | G06F 40/30 |
| | | | | 704/9 |
| 2023/0316003 A1* | 10/2023 | Friedman | ............ | G06N 3/0442 |
| | | | | 704/9 |
| 2024/0193377 A1* | 6/2024 | Pan | ...................... | G06F 40/58 |
| 2025/0021760 A1* | 1/2025 | Li | ....................... | G06F 40/284 |

FOREIGN PATENT DOCUMENTS

| | | |
|---|---|---|
| CN | 113836949 A | 12/2021 |
| CN | 114330327 A | 4/2022 |
| CN | 114398899 A | 4/2022 |
| CN | 114565104 A | 5/2022 |

OTHER PUBLICATIONS

Tan, et al., "Vokenization: Improving Language Understanding with Contextualized, Visual-Grounded Supervision," arXiv:2010.06775v1 [cs.CL] Oct. 14, 2020.

Conneau, et al., "Unsupervised Cross-lingual Representation Learning at Scale," arXiv:1911.02116v2 [cs.CL] Apr. 8, 2020.

Liu, et al., "ROBERTa: A Robustly Optimized BERT Pretraining Approach," arXiv:1907.11692v1 [cs.CL] Jul. 26, 2019.

Devlin, et al., "BERT: Pre-training of Deep Bidirectional Transformers for Language Understanding," arXiv:1810.04805v2 [cs.CL] May 24, 2019.

* cited by examiner

| TASK | MLM ONLY | | MLM + Contrastive Learning | | | | HF Bert Base | |
|---|---|---|---|---|---|---|---|---|
| | Score | Standard | Score | Standard | Delta % | Total Std % | | |
| ALMR | 0.815 | 0.003 | 0.841 | 0.004 | 2.617 | 0.724 | 0.867 | 0.005 |
| ALMS | 0.841 | 0.003 | 0.854 | 0.002 | 1.299 | 0.572 | 0.856 | 0.002 |
| ALROT | 0.838 | 0.002 | 0.851 | 0.004 | 1.328 | 0.608 | 0.87 | 0.002 |
| EMARC | 0.82 | 0.012 | 0.853 | 0.016 | 3.359 | 2.885 | 0.8 | 0.041 |
| EMAVA | 0.727 | 0.007 | 0.732 | 0.008 | 0.556 | 1.487 | 0.694 | 0.019 |
| EMFCASE | 0.819 | 0.025 | 0.963 | 0.012 | 11.698 | 3.707 | 0.825 | 0.056 |
| EMICONV | 0.847 | 0.008 | 0.873 | 0.01 | 2.617 | 1.793 | 0.831 | 0.014 |
| EMMOVDLG | 0.74 | 0.008 | 0.775 | 0.009 | 3.467 | 1.642 | 0.785 | 0.007 |
| EMPAY | 0.913 | 0.007 | 0.921 | 0.004 | 0.736 | 1.079 | 0.917 | 0.004 |
| EMPUBCROV | 0.633 | 0.003 | 0.645 | 0.002 | 1.205 | 0.505 | 0.659 | 0.003 |
| EMRED | 0.728 | 0.004 | 0.744 | 0.005 | 1.537 | 0.907 | 0.744 | 0.004 |
| EMSPEECH | 0.977 | 0.003 | 0.976 | 0.002 | -0.098 | 0.46 | 0.975 | 0.007 |
| EMTED | 0.83 | 0.004 | 0.841 | 0.004 | 1.101 | 0.741 | 0.853 | 0.003 |
| EMVOG | 0.917 | 0.019 | 0.918 | 0.012 | 0.132 | 3.075 | 0.88 | 0.021 |
| EMWTBOT | 0.948 | 0.002 | 0.954 | 0.002 | 0.54 | 0.377 | 0.954 | 0.002 |
| EMWVA | 0.869 | 0.003 | 0.885 | 0.007 | 1.57 | 0.979 | 0.863 | 0.009 |
| WDSHEJIH | 0.798 | 0.008 | 0.81 | 0.006 | 1.227 | 1.452 | 0.817 | 0.016 |
| | Avg 0.827 | | Avg 0.848 | | Avg 2.052 | | Avg 0.835 | |

FIG. 6

MONO-LINGUAL LANGUAGE MODELS USING PARALLEL DATA

BACKGROUND

Mono-lingual language models can be used to train other pre-trained language models to improve performance via a variety of data. Further, parallel data can be used to train different language models in different languages. The subject disclosure is related to improving the mono-lingual language model by incorporating the standard mask language modeling loss on mono-lingual data with the standard mask language modeling loss on the target language in the parallel data and contrastive training loss from parallel language data.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate improving a mono-lingual language model using pre-trained models and parallel data are provided.

According to an embodiment, a system can comprise a processor that executes computer executable components stored in memory. The computer executable components can comprise a training component that can use a first language model to improve a second language model through mask language modeling (MLM) training and contrastive learning. Further, the computer executable components can comprise a data component that can collect parallel data for the first language model and the second language model. The computer executable components can comprise a tokenizing component that can tokenize the parallel data. Additionally, the computer executable components can comprise an alignment component that can create an alignment of the tokenized parallel data.

According to an embodiment, a computer-implemented method for improving a mono-lingual language model using pre-trained models and parallel data, can comprise using, by a device operatively coupled to a processor, a first language model to improve a second language model. Additionally, the computer-implemented method can comprise collecting, by the device, parallel data for the first language model and the second language model. The computer-implemented method can comprise tokenizing, by the device, the parallel data. Further, the computer-implemented method can comprise creating, by the device, an alignment of the tokenized parallel data. Additionally, the computer-implemented method can comprise training, by the device, to minimize the loss of the mono-lingual second language model via mask language modeling (MLM) training and contrastive learning.

According to an embodiment, a computer program product comprising a computer readable storage medium having program instructions embodied therewith, the program instructions can be executable by a processor to cause the processor to use a first language model to improve a second language model. The computer program product can cause the processor to collect parallel data for the first language model and the second langue model. Additionally, the computer program product can cause the processor to tokenize the parallel data. Further, the computer program product can cause the processor to create an alignment of the tokenized parallel data. The computer program product can cause the processor to train to minimize loss of the mono-lingual second language model via mask language modeling (MLM) training and contrastive learning.

DESCRIPTION OF THE DRAWINGS

FIG. 6 illustrates experimental results of an example, non-limiting system that can facilitate improving a mono-lingual language model using pre-trained models and parallel data, in accordance with one or more embodiments described herein.

DETAILED DESCRIPTION

Figure 1:
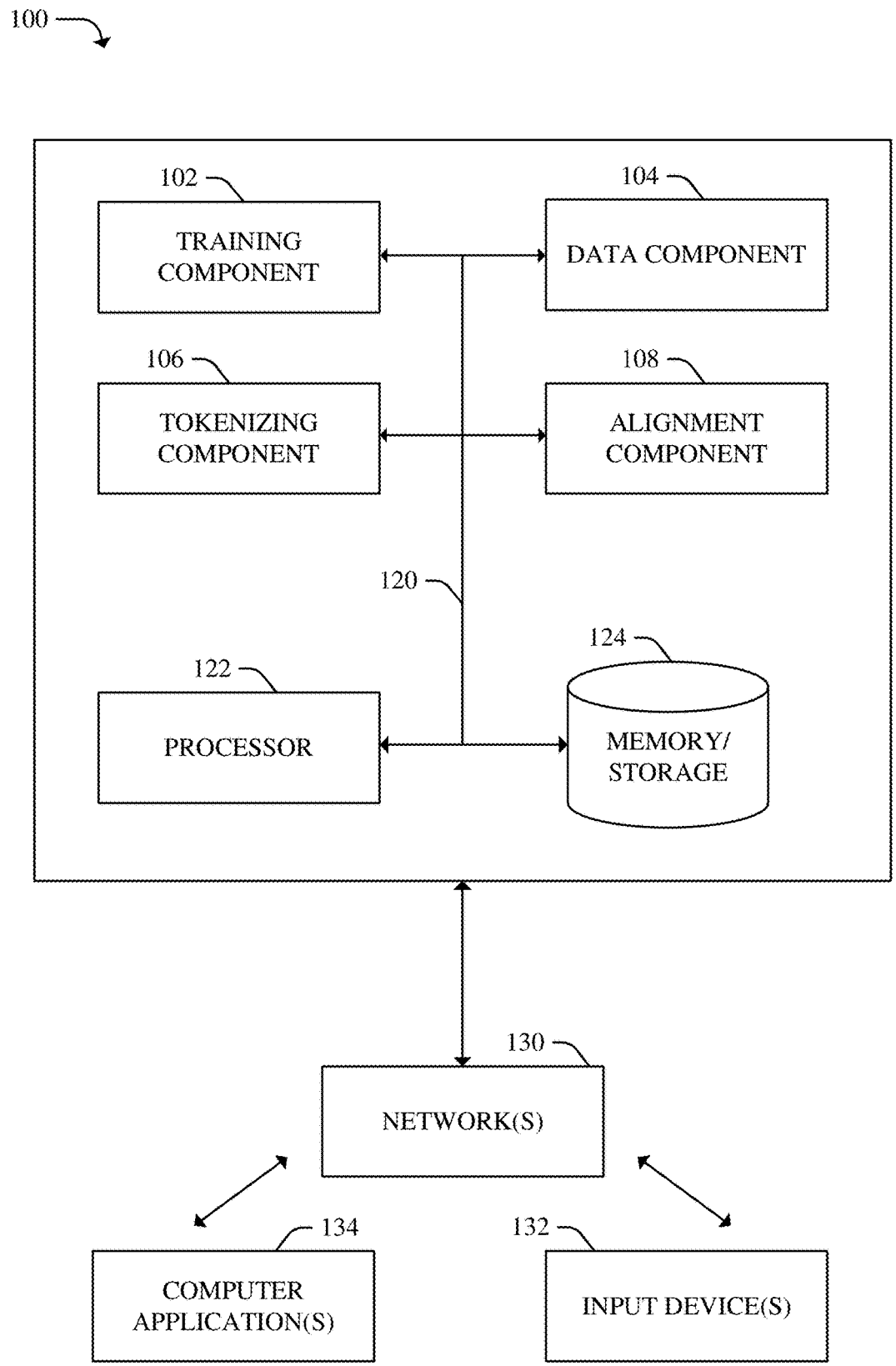
FIG. 1 illustrates a block diagram of an example, non-limiting system that can facilitate improving a mono-lingual language model using pre-trained models and parallel data, in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Transformer-based language models have revolutionized the field of Natural Language Processing (NLP) and have become the foundation of modern NLP solutions. These models have demonstrated remarkable performance in various language-related tasks, including machine translation, text generation, sentiment analysis, and question answering, among others.

The training process for a transformer language model typically consists of two stages: pre-training and fine-tuning. During pre-training, the model is exposed to a large corpus of text data and learns to predict the next word in a sentence, effectively capturing the underlying patterns and structures of the language. This unsupervised learning approach, known as self-supervised training, has proven to be highly effective in capturing the semantic and syntactic nuances of natural language.

However, the success of pre-training relies heavily on the availability of massive amounts of training data. Typically, transformer language models are trained on datasets consisting of orders of terabytes (TB) of text data, which is readily available from the internet. This abundance of training data allows the models to capture a wide range of language patterns and nuances, resulting in their impressive performance.

Unfortunately, not every language benefits equally from this approach due to the limited availability of training data. Low-resource languages, in particular, suffer from insufficient training data, which hampers the performance of language models specifically tailored to those languages. As a consequence, these low-resource language models often struggle to achieve the same level of accuracy and fluency as their high-resource counterparts.

One approach to address the limitations of low-resource languages is the use of multi-lingual models. By training a single model on data from multiple languages, these models aim to leverage the knowledge and patterns shared across languages to improve performance. However, including too many languages in a multi-lingual model can lead to what is known as the "curse of multilinguality." This curse refers to the phenomenon where the performance of the model deteriorates as more languages are included, potentially due to the conflicting patterns and linguistic variations among different languages.

In summary, transformer-based language models have significantly advanced the field of NLP, serving as the foundation of modern NLP solutions. The two-stage training process, consisting of pre-training and fine-tuning, has proven to be highly effective in capturing the nuances of natural language. However, the reliance on large amounts of training data poses challenges for low-resource languages, limiting the performance of language models tailored to these languages. While multi-lingual models offer potential improvements, there is a trade-off between including more languages and maintaining optimal performance, as the curse of multilinguality can hinder the model's effectiveness.

In some embodiments, the present disclosure can be implemented to produce a solution to the problems described above in the form of systems, computer-implemented methods, and/or computer program products that can further facilitate using a first language model to improve a second language model; collecting parallel data for the first langue model and the second language model; tokenizing the parallel data; and creating an alignment of the tokenized parallel data.

As referenced herein, an "entity" can comprise a client, a user, a computing device, a software application, an agent, a machine learning (ML) model, an artificial intelligence (AI) model, and/or another entity.

FIG. 1 illustrates a block diagram of an example, non-limiting monolingual model improvement system 100 that comprises a training component 102, a data component 104, a tokenizing component 106, and an alignment component. The training component 102 can use a first language model to improve a mono-lingual second language model through mask language modeling (MLM) training and contrastive learning. Further, the data component 104 can collect parallel data for the first language model and the mono-lingual second language model. The tokenizing component 106 can tokenize the parallel data (e.g., as collected by the data component 104) for the first language model and the mono-lingual second language model. Additionally, the alignment component 108 can create an alignment of the tokenized parallel data. Repetitive description of like elements employed in other embodiments described herein is omitted for sake of brevity. Aspects of systems (e.g., the mono-lingual model improvement system 100 and the like), apparatuses or processes in various embodiments of the present invention can constitute one or more machine-executable components embodied within one or more machines (e.g., embodied in one or more computer readable mediums (or media) associated with one or more machines). Such components, when executed by the one or more machines (e.g., computers, computing devices, virtual machines, a combination thereof, and/or the like) can cause the machines to perform the operations described.

Figure 10:
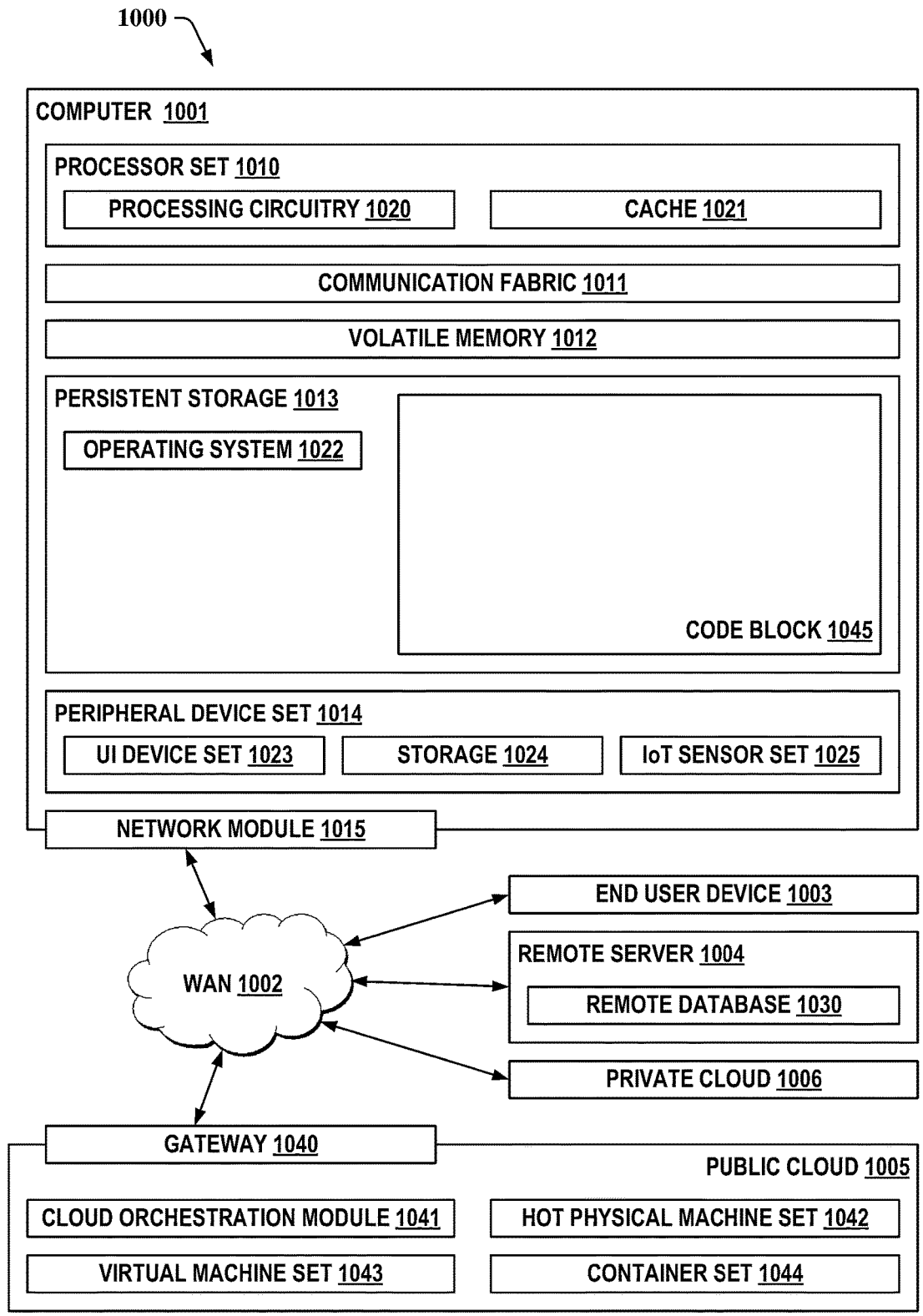
FIG. 10 illustrates a block diagram of an example, non-limiting operating environment in which one or more embodiments described herein can be facilitated.

Additional description of functionalities will be further described below with reference to the example embodiments of FIG. 1, where repetitive description of like elements and/or processes employed in respective embodiments is omitted for sake of brevity. The mono-lingual model improvement system 100 can facilitate: i) using a first language model to improve a mono-lingual second language model; ii) collecting parallel data for the first language model and the mono-lingual second language model; iii) tokenizing the parallel data for the first language model and the mono-lingual second language model; iv) creating an alignment of the tokenized parallel data; and v) training to minimize the loss of the mono-lingual second language model via mask language modeling (MLM) training and contrastive learning. Further, the training component 102, the data component 104, tokenizing component 106, and the alignment component 108 can be associated with a computing environment 1000 (FIG. 10).

Discussion first turns briefly to system bus 120, processor 122, and memory 124 of mono-lingual model improvement system 100. For example, in one or more embodiments, the mono-lingual model improvement system 100 can comprise processor 122 (e.g., computer processing unit, microprocessor, classical processor, and/or like processor). In one or more embodiments, a component associated with mono-lingual model improvement system 100, as described herein with or without reference to the one or more figures of the one or more embodiments, can comprise one or more computer and/or machine readable, writable and/or executable components and/or instructions that can be executed by processor 122 to enable performance of one or more processes defined by such component(s) and/or instruction(s).

In one or more embodiments, mono-lingual model improvement system 100 can comprise a computer-readable memory (e.g., memory 124) that can be operably connected to the processor 122. Memory 124 can store computer-executable instructions that, upon execution by processor 122, can cause processor 122 and/or one or more other components of the mono-lingual model improvement system 100 (e.g., the training component 102, the data component 104, the tokenizing component 106, and the alignment component 108) to perform one or more actions. In one or more embodiments, memory 124 can store computer-executable components (e.g., the training component 102, the data component 104, the tokenizing component 106, and the alignment component 108).

With embodiments, mono-lingual model improvement system 100 and/or a component thereof as described herein, can be communicatively, electrically, operatively, optically and/or otherwise coupled to one another via bus 120. Bus 120 can comprise one or more of a memory bus, memory controller, peripheral bus, external bus, local bus, and/or another type of bus that can employ one or more bus architectures. One or more of these examples of bus 120 can be employed. In one or more embodiments, the mono-lingual model improvement system 100 can be coupled (e.g., communicatively, electrically, operatively, optically and/or like function) to one or more external systems (e.g., a non-illustrated electrical output production system, one or more output targets, an output target controller and/or the like), sources and/or devices (e.g., classical computing devices, communication devices and/or like devices), such as via a network. In one or more embodiments, one or more of the components of the mono-lingual model improvement system 100 can reside in the cloud, and/or can reside locally in a local computing environment (e.g., at a specified location(s)). In examples, the mono-lingual model improvement system 100 can be connected with the bus 120, one or more input devices 132, and one or more computer applications 134, which can be associated with cloud computing environment 1000 (FIG. 10).

In addition to the processor 122 and/or memory 124 described above, the mono-lingual model improvement system 100 can comprise one or more computer and/or machine readable, writable and/or executable components and/or instructions that, when executed by processor 122, can enable performance of one or more operations defined by such component(s) and/or instruction(s). The mono-lingual model improvement system 100 can be associated with, such as accessible via, a computing environment 1000 described below with reference to FIG. 10. For example, mono-lingual model improvement system 100 can be associated with a computing environment 1000 such that aspects of processing can be distributed between the mono-lingual model improvement system 100 and the computing environment 1000.

Figure 2:
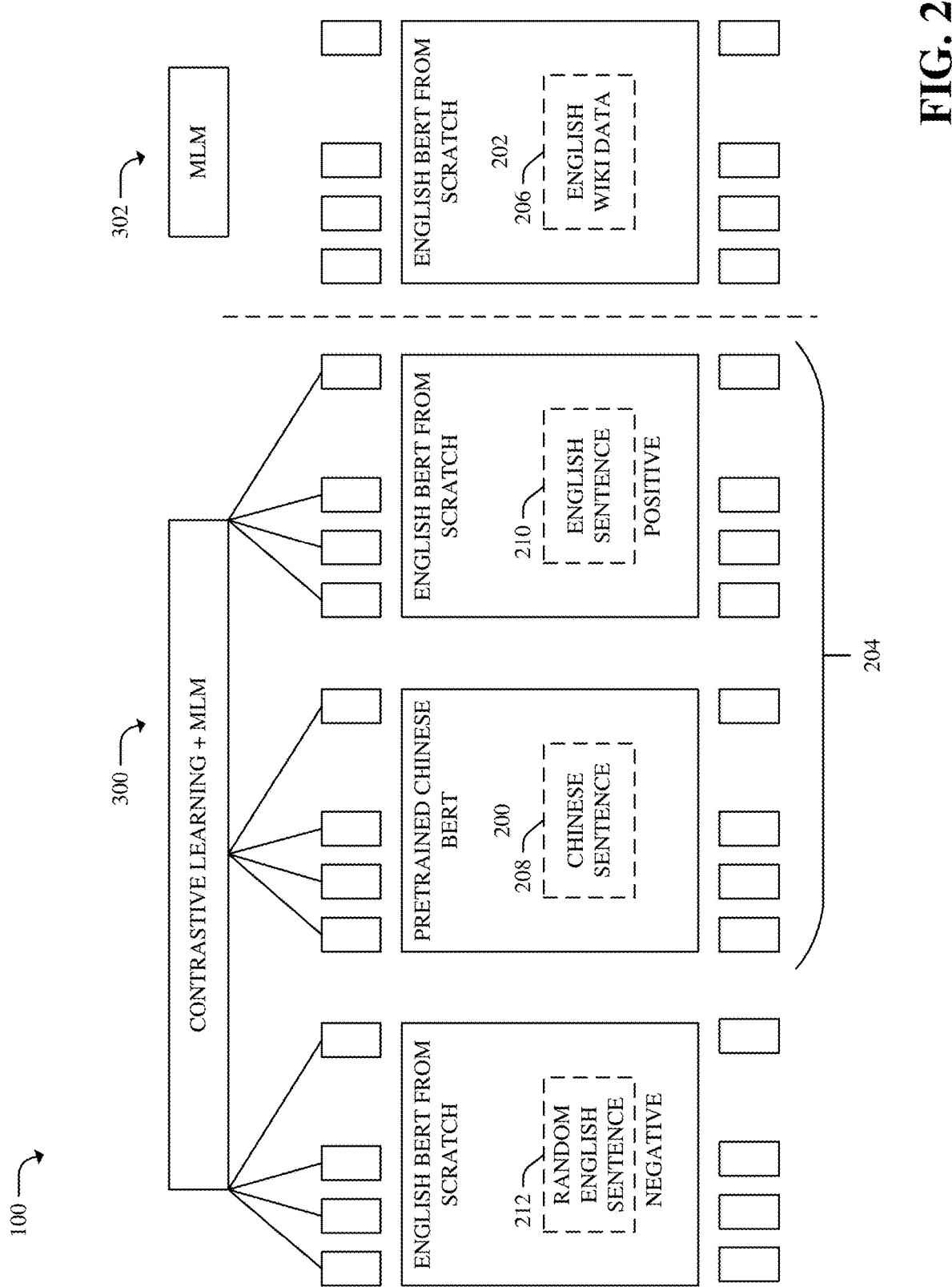
FIG. 2 illustrates a block diagram of an example, non-limiting system that can facilitate improving a mono-lingual language model using pre-trained models and parallel data, in accordance with one or more embodiments described herein.

In embodiments, FIG. 2 generally illustrates a block diagram of an example, non-limiting system 100 that can facilitate using a first language model 200 to improve a mono-lingual second language model 202 via parallel data 204, in accordance with one or more embodiments described herein. The first language model 200 can be a multilingual language model or can be a mono-lingual language model. Further, the first language model 200 can be pre-trained and can be a Chinese Bidirectional Encoder Representations from Transformer (BERT) model.

Figure 3:
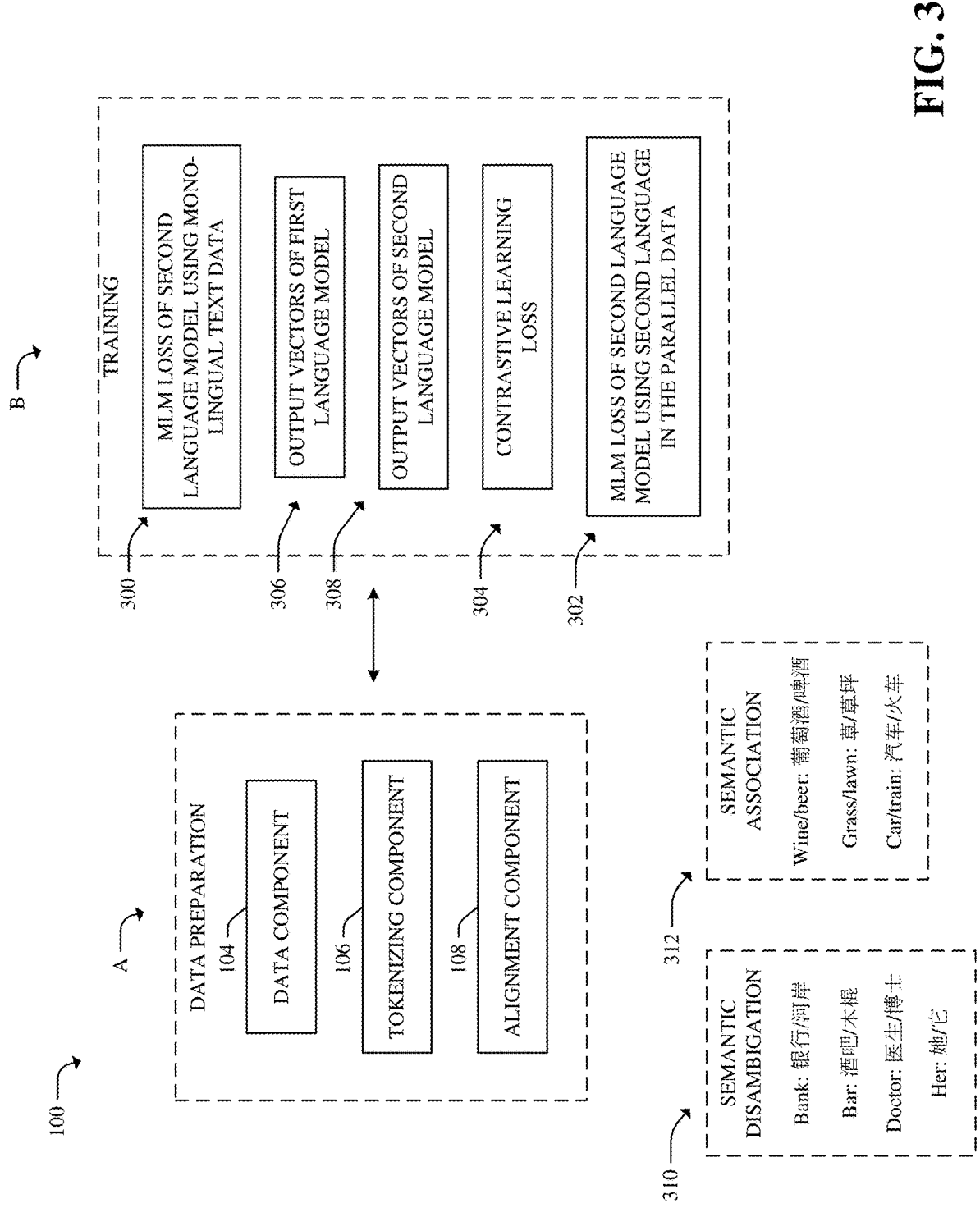
FIG. 3 illustrates a block diagram of an example, non-limiting system that can facilitate improving a mono-lingual language model using pre-trained models and parallel data, in accordance with one or more embodiments described herein.

Further, the system 100 can include pre-training which can include a data preparation stage (e.g., as generally shown as A in FIG. 3) where data can be prepared to be used for training on each batch of training data (e.g., as generally shown as B in FIG. 3). The data preparation stage can include the following steps of: (1) collecting parallel data 204 for the first language (e.g., the language of the first language model 200) and the second language (e.g., the language of the monolingual second language model 202) via the data component 104; (2) tokenizing the parallel data 204 for the first language and the second language via the tokenizing component 106; and (3) creating an alignment of the tokenized parallel data 204 for the first language and the tokenized parallel data 204 for the second language via the alignment component 108. The alignment component 108 can generate/create the alignment using one or more existing tools (e.g., such as fast_align, neural aligners, etc.). When dealing with parallel data 204, it can be useful to ensure that tokens are aligned across languages. One common approach can be to tokenize each sentence in both languages separately using model-specific tokenization methods and then align the tokens using alignment tools or techniques. Alignment tools like fast_align or GIZA++ can be used to align the tokens based on word alignment models.

The mono-lingual model improvement system 100 can further include one or more of a variety of stages to train the mono-lingual second language model 202. The one or more stages can comprise a pre-training stage (e.g., stage A and stage B of FIG. 3) and a fine-tuning stage. In the pre-training stage, self-supervised training can be the dominant method of pre-training. Such a method can involve a large amount of data (e.g., terabytes of training data). With examples, not every language can have such a large amount of training data available on the internet, which can limit the performance of the low-resource language models.

During the pre-training stage, a mono-lingual second language model 202 can be pre-trained using other pre-trained language models in different languages and parallel data 204. The mono-lingual second language model 202 can be an English BERT model (e.g., comprising mono-lingual text data which can be in the form of English Wikipedia Data). The training data used to improve the mono-lingual second language model 202 can include parallel data 204 and mono-lingual text data 206. For example and without limitation, mono-lingual text data 206 can comprise textual content that is written in a single language, which can consist of documents, sentences, or individual words expressed in one specific language without any mixed or translated content from other languages. As seen in FIG. 2, the mono-lingual text data 206 can include English Wikipedia data. Further, pre-training the mono-lingual second language model 202 can be conducted with the goal of minimizing loss for the mono-lingual second language model 202. Additionally, minimizing loss can include minimizing three loss functions collectively. For example and without limitation, the loss functions can include (1) a first standard mask language modeling (MLM) loss 300 of the mono-lingual second language model 202 using the mono-lingual text data 206; (2) a second standard MLM loss 302 of the mono-lingual second language model 202 using the parallel data 204; and (3) the contrastive training loss (e.g., contrastive loss 304) on the parallel data 204. Further, the contrastive training loss 304 can be determined via an Information Noise Contrastive Estimation (e.g., infoNCE) loss function.

Further, to calculate the InfoNCE loss, the model can use a similarity function (e.g., cosine similarity or dot product)

to measure the similarity between the representations of the data pairs. The similarity scores can be normalized and transformed into probabilities using a softmax function. The loss can be computed as the negative log-likelihood of the true positive pair probability. By maximizing the likelihood of positive pairs and minimizing the likelihood of negative pairs, InfoNCE can encourage the model to learn meaningful representations that capture the underlying structure and patterns in the data. It can enable the model to discover useful features and improve its performance on downstream tasks, such as classification or clustering, without requiring labeled data for training.

Such as can be seen in FIG. 2, the mono-lingual model improvement system 100 can include using the first language model (e.g., a pre-trained Chinese BERT model) 200 and English and Chinese parallel data 204 to improve the mono-lingual second language model 202 (e.g., an English BERT model from scratch). The mono-lingual model improvement system 100 can perform/conduct contrastive learning via a Chinese sentence (C) 200, a positive English sentence (Pe) 210, and a negative English sentence (Ne) 212 (e.g., a random English sentence with a different meaning than the positive English sentence (Pe) 210). The positive English sentence (Pe) 210 can include the same meaning as the Chinese sentence (C) 208. Further, the negative English sentence (Ne) 212 can include a different meaning than that of the Chinese sentence (C) 208. A pair of the system 100 can be considered as both the positive English sentence (Pe) 210 and the equivalent Chinese sentence (C) 208 including the same meaning. Further, the mono-lingual text data 206 of the second mono-lingual second language model 202 can include English Wikipedia data for additional training.

In embodiments, such as during training, a first training score can be calculated via the Chinese sentence (C) 200 and the positive English Sentence (Pe) 210. Additionally, a second training score can be calculated via the Chinese sentence (C) 200 and the negative English sentence (Ne) 212. The contrastive loss can be calculated (e.g., by the training component 102) based on the first training score and the second training score. Further, the contrastive loss for the system 100 can be minimized during training (e.g., training the second language model 202 via the first language model 200).

In examples, the pair including the negative English sentence (Ne) 212 and the positive English sentence (Pe) 210 can be used for contrastive training (e.g., via the training component 102), which can help the mono-lingual second language model 202 distinguish between the positive English sentences (Pe) 210 and negative English sentences (Ne) 212. Contrastive learning can involve training the second language model 202 to distinguish between the positive English sentences (Pe) 210 and the negative English sentences (Ne) 212. The training component 102 can learn to encode the semantic and syntactic similarities between the sentence pairs while differentiating the negative English sentences (Ne) 212.

With embodiments, the pre-training process can involve maximizing the similarity between the representations of the positive English sentence 210 and the Chinese sentence (C) 208 and minimizing the similarity between the representations of the negative English sentence (Ne) 212 and the Chinese sentence (C) 208. In this manner, the mono-lingual model improvement system 100 can learn to effectively capture the shared semantic and syntactic structures across languages, leading to improved performance in tasks such as machine translation and cross-lingual information retrieval.

In examples, such as generally illustrated in FIGS. 2 and 3, the mono-lingual model improvement system 100 can comprise the mono-lingual second language model 202 that can receive the mono-lingual text data 206 (e.g., English Wikipedia data) as training data and can apply an MLM loss on such data. The training component 102 can be configured to determine a combined loss for three different loss portions. For example and without limitation, the combined loss can be determined in the pre-training stage for the system 100 and can include: a first MLM loss 300 of the mono-lingual second language model 202 using mono-lingual text data 206 (e.g., English Wikipedia data); a second MLM loss 302 of the mono-lingual second language model 202 using the English part of the parallel data 204 (e.g., the positive English sentences (Pe)) for the mono-lingual second language model 202. Further, the training component 102 can determine a contrastive loss 304 on the parallel data 204.

With embodiments, MLM loss can be a training objective used in the context of language models, specifically in the Transformer-based models like BERT. The MLM loss can aim to improve a model's ability to understand and generate coherent text by predicting missing or masked words in a given sentence. For example, during training, a certain percentage of the input tokens in a sentence can be randomly selected and replaced with a special "mask" token. The model's objective can be to predict the original masked tokens based on the surrounding context. This process can encourage the model to learn contextual relationships and representations of words within the language.

The MLM loss can be calculated by comparing the predicted probabilities of the model for the masked positions with the true token identities. The system 100 can be optimized to minimize the difference between its predictions and the ground truth labels. The loss can be calculated using cross-entropy loss, which measures the dissimilarity between the predicted probability distribution and the true distribution of the masked tokens. By training on the MLM loss, the system 100 can learn to capture contextual information and develop a deeper understanding of language semantics. It can help the system 100 generate more coherent and contextually appropriate text, making it useful for various downstream tasks such as text classification, named entity recognition, and question answering.

The training process can involve multiple iterations over the entire dataset, where each iteration can be referred to as an epoch. In each epoch, the training data can be divided into batches, and by training on batches of data, the training process can become more computationally efficient and allows for parallelization, as multiple batches can be processed simultaneously on GPUs or distributed systems. Additionally, training on batches can help the system 100 generalize better by exposing it to a diverse range of examples in each iteration.

With embodiments, the training data can be completed in batches, for example, where 32 sentence pairs can be included in a batch, forming 32 positive pairs. For each positive pair, all the other sentences in the batch can be treated as a negative sentence, and when combined with each sentence of the positive pair, 62 negative pairs can be created (e.g., in-batch negative).

In embodiments, the training for each batch of training data can include one or more of a variety of calculations and/or alignments when using the first language model 200 to improve a mono-lingual second language model 202. Further, training can comprise calculating a first MLM loss 300 of the mono-lingual second language model 202 using the mono-lingual text data (e.g., the English Wikipedia data) via the training component 102.

With embodiments, during training, the training component 102 can additionally determine one or more first output vectors (V_pc_A) 306 of the first language model 200 using the parallel data of the first language model 200. Further, the training component 102 can determine one or more second output vectors (V_pc_B) 308 of the monolingual second language model 202 using the parallel data of the monolingual second language model 202. With the first output vectors and the second output vectors, the training component 102 and/or the alignment component can re-order the one or more first output vectors based on the alignment of the tokenized parallel data to align the one or more first output vectors with the one or more second output vectors. The training component 102 can further determine the contrastive loss 304 on the parallel data using the one or more first output vectors, one or more paired sentence vectors (e.g., positive English sentences pairs 210, V_pc_B+) of the monolingual second language model 202, and one or more unpaired sentence vectors (e.g., negative English sentence pairs 212, V_pc_B−) of the monolingual second language model 202 in the same batch as the one or more paired sentence vectors. Additionally, the training component 102 can calculate the second MLM loss 302 of the monolingual second language model 202 using the second language in the parallel data. A total loss can be determined for the system 100 by multiplying a summation of the first MLM loss 300, the second MLM loss 302, and the contrastive loss 304 by λ, where λ can be used to represent a hyperparameter that controls the relative weighting of positive and negative pairs in the loss calculation. This hyperparameter determines the balance between encouraging similarity for positive pairs and promoting dissimilarity for negative pairs. The contrastive loss 304 can aim to maximize the agreement between similar pairs and minimize the agreement between dissimilar pairs. This can be achieved by calculating a similarity score or distance metric between pairs of samples and applying a contrastive loss function. The contrastive loss 304 can involves two terms: the positive term and the negative term. The positive term can represent the similarity between samples from the same class or with a known relationship, while the negative term can represent the dissimilarity between samples from different classes or with no known relationship.

With embodiments, using a different language from the language of the monolingual second language model 202 can help to improve the performance of the monolingual second language model 202 by providing semantic disambiguation 310 and semantic association 312. For example, semantic disambiguation 310 can provide training for the monolingual second language model 202 in instances where the first language (e.g., Chinese) can include multiple words for a single word in the second language (e.g., English). The English word for "bank" can include multiple meanings, such as a bank for a river, or a monetary bank where money can be deposited. However, the Chinese equivalent for bank in the two instances, can be two completely different words (e.g., in terms of word structure). Identifying and analyzing semantic disambiguation 310 can improve performance of the monolingual second language model 202. Additionally, semantic association 312 can provide training for the monolingual second language model 202. For example, semantic association 312 can provide training for the monolingual second language model 202 in instances where one or more words from the first language can share word characteristics (e.g., spelling and/or structure) with one or more words in the second language. Distinguishing the languages used in training by semantic disambiguation 310 and semantic association 312 can improve performance of the monolingual second language model 202.

Additionally, in embodiments, the first language model 200 and the monolingual second language model 202 can be mutually improved. For example and without limitation, the performance of the first language model 200 can be improved by using language pairs in the first language and in the second language. Additionally, in a mutual manner, the performance of the monolingual second language model 202 can be improved by using language pairs in the first language and in the second language.

In further embodiments, the first language model 200 and the monolingual second language model 202 can be additively improved. For example and without limitation, the performance of the first language model 200 or the monolingual second language model 202 can be improved by using language pairs for any number of languages. One or more languages can be added to the training process for the first language model 200 or the monolingual second language model 202 for additive improvement.

Figure 4:
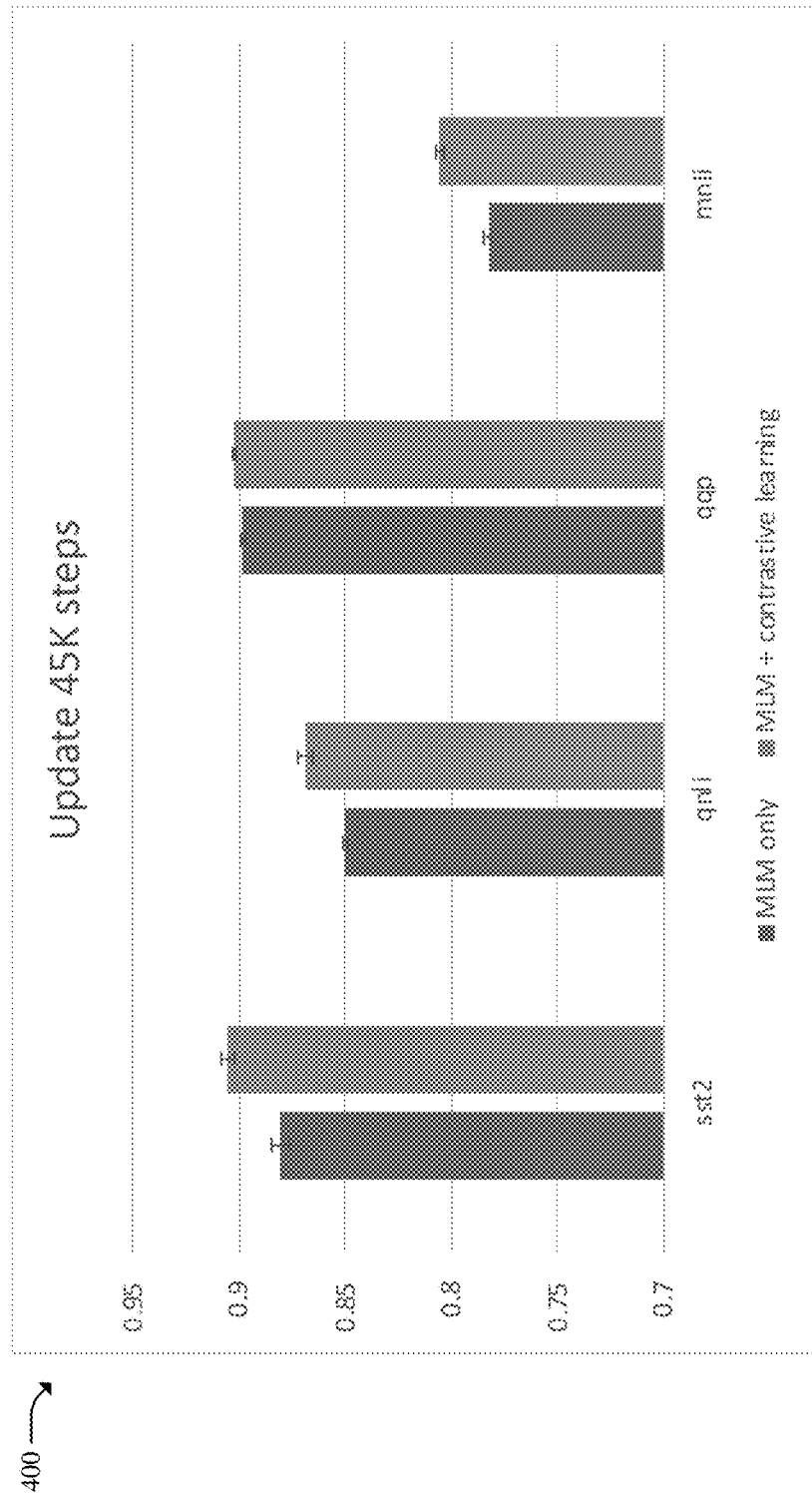
FIG. 4 illustrates experimental results of an example, non-limiting system that can facilitate improving a mono-lingual language model using pre-trained models and parallel data, in accordance with one or more embodiments described herein.

Turning next to FIG. 4, which includes plot 400 and table 402 illustrating experimental results of the mono-lingual model improvement system 100 simulated over 45,000 training steps. Further, the experiment includes performing four downstream tasks (e.g., sst2, qnli, qqp, and mnli) which can be standard benchmark GLUE tasks used to evaluate mono-lingual language models. Performance can be observed for the mono-lingual model improvement system 100 between instances where only MLM loss can be considered (e.g., the first MLM loss 300 and the second MLM loss 302). Further, improved performance can be observed for the mono-lingual improvement system 100 where both MLM loss 300, 302 and contrastive loss 304 can be considered and factored into training. As can be seen in table 402, for each of the GLUE tasks performed, the improvement of the system 100 (e.g., "Delta %") can be greater than the standard deviation (Total std %) indicating significant improvement when including contrastive loss. The results can be averaged over 10 random seeds.

Figure 5:
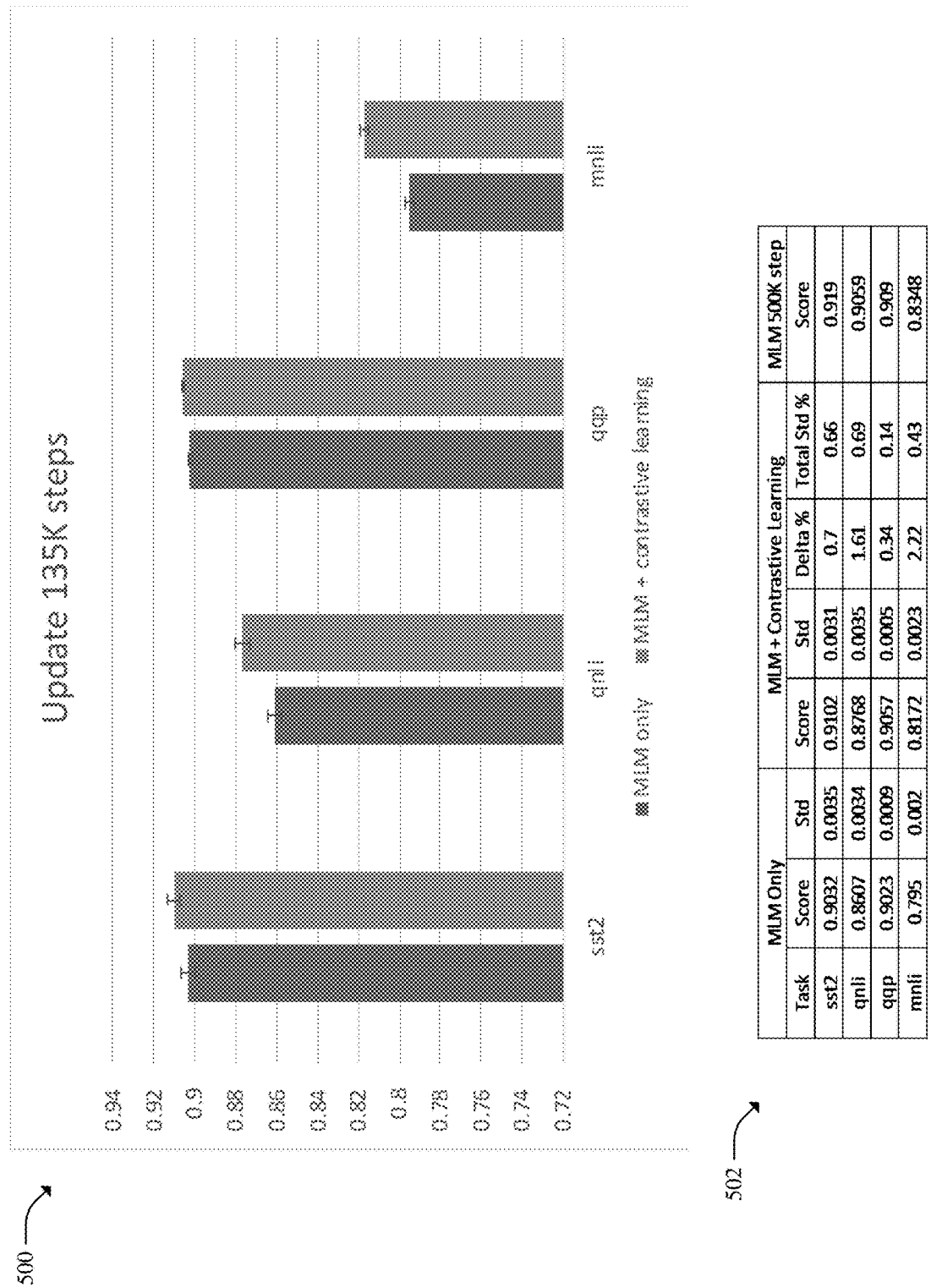
FIG. 5 illustrates experimental results of an example, non-limiting system that can facilitate improving a mono-lingual language model using pre-trained models and parallel data, in accordance with one or more embodiments described herein.

Turning next to FIG. 5, which includes plot 500 and table 502 illustrating experimental results of the mono-lingual model improvement system 100 simulated over 135,000 training steps. Further, the experiment includes performing four downstream tasks (e.g., sst2, qnli, qqp, and mnli) which can be standard benchmark GLUE tasks used to evaluate mono-lingual languages. Performance can be observed for the mono-lingual model improvement system 100 between instances where only MLM loss can be considered (e.g., the first MLM loss and the second MLM loss). Further, improved performance can be observed for the mono-lingual model improvement system 100 where both MLM loss and contrastive loss are considered and factored into training. As can be seen in table 502, for each of the GLUE tasks performed, the improvement of the system 100 (e.g., "Delta %") is greater than the standard deviation (Total std %) indicating significant improvement when including contrastive loss. The results can be averaged over 10 random seeds. The results from training over 135,000 training steps with MLM loss and contrastive loss can be compared with performing 500,000 training steps with only MLM loss considered. Similar performance can be observed for training over 500,000 steps when factoring in only MLM loss as can be observed for training over 135,00 steps with MLM loss and contrastive loss. Significantly fewer training steps can be involved to generate similar performance by considering the first MLM loss 300, the second MLM loss 302, and the contrastive loss 304.

With embodiments, such as illustrated in FIG. 6, a sentiment analysis can be conducted over 135,000 training steps averaged over 10 random seeds. Table 600 can illustrate performing a quantity of downstream tasks (e.g., 17 tasks) in which all receive some form of improvement by factoring in the first MLM loss 300, the second MLM loss 302, and the contrastive loss 304 on the parallel data 204. For many instances, the improvement ("Delta %") of one or more tasks can be shown to be larger than the standard deviation (total std %) indicating significant improvement for the monolingual second language model 202. The model trained with contrastive loss and MLM for only 135,000 steps can even surpass the performance of a fully trained BERT model which has seen much more data.

Figure 7:
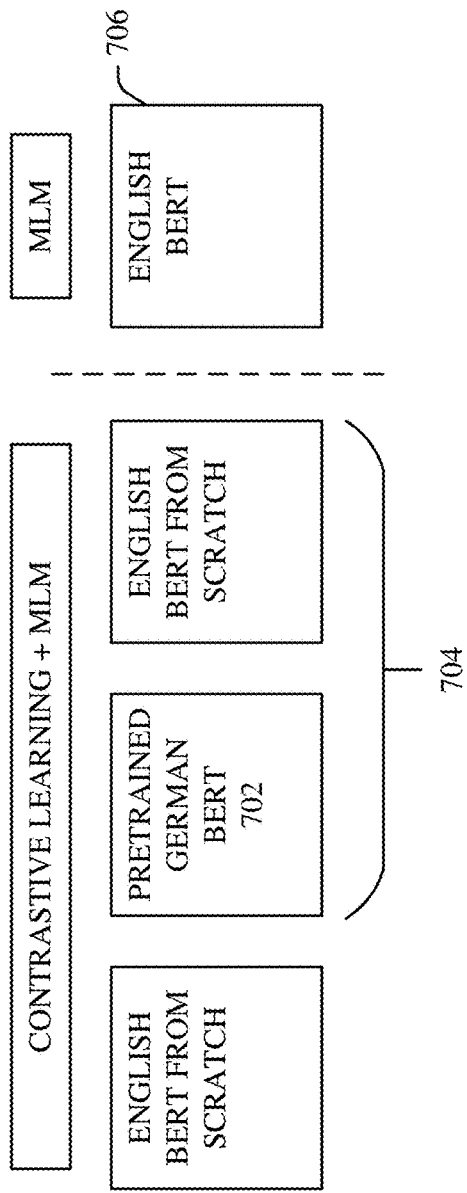
FIG. 7 illustrates experimental results of an example, non-limiting system that can facilitate improving a mono-lingual language model using pre-trained models and parallel data, in accordance with one or more embodiments described herein.

In embodiments, such as illustrated in FIG. 7, experimental results can be observed in table 700 from using a pre-trained German BERT model 702 in combination with English and German parallel data 704 to improve an English BERT model 706. The training can occur over 45,000 steps of training and the results can be average on about 10 seeds. Similar improvements can be observed in table 700 as observed in table 500 and table 600 where the improvement ("Delta %") of the one or more tasks can be larger than the standard deviation ("Total std %") indicating a significant improvement when including contrastive loss.

Figure 8:
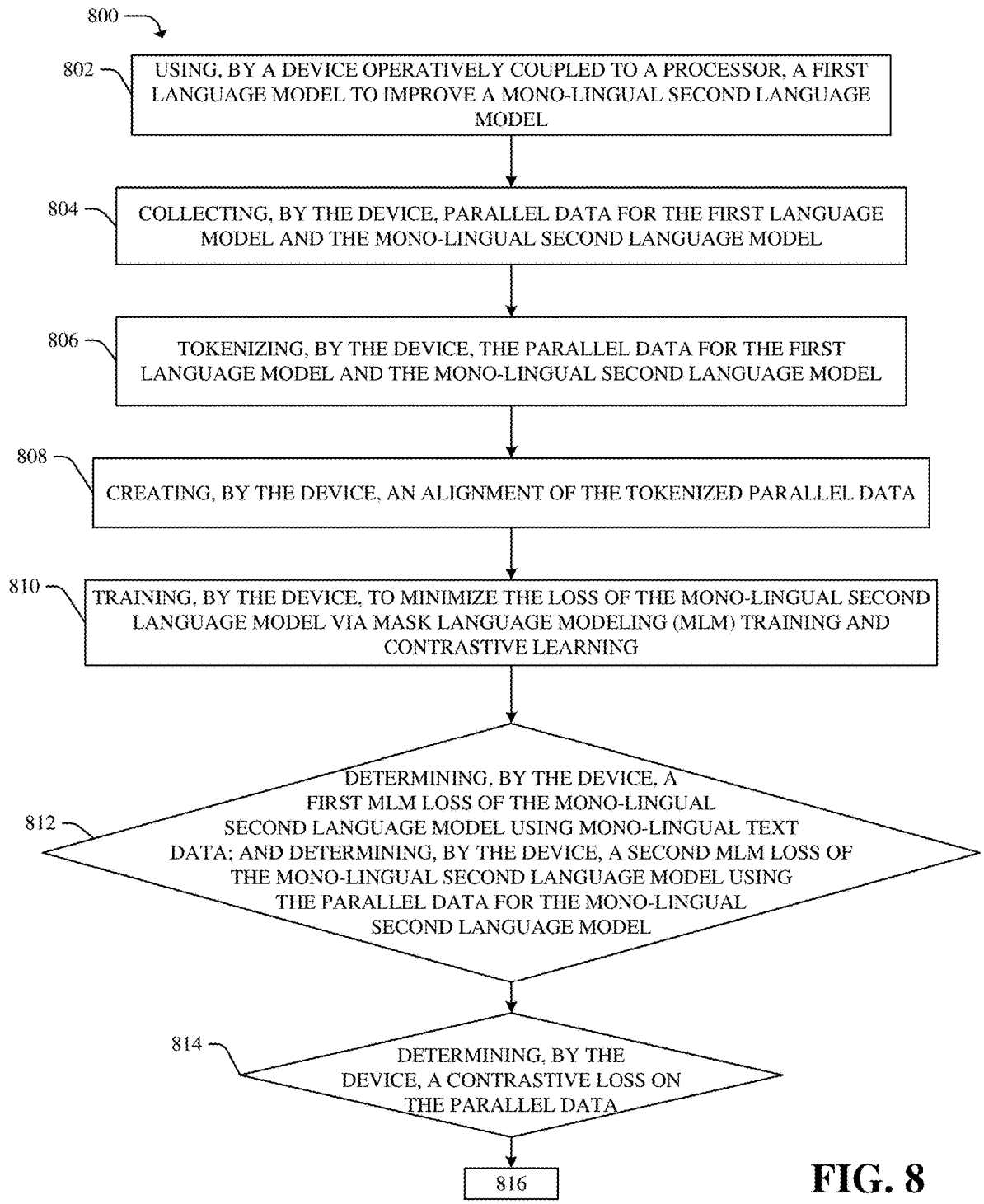
FIG. 8 illustrates a flow diagram of an example, non-limiting computer-implemented method that can facilitate improving a mono-lingual language model using pre-trained models and parallel data, in accordance with one or more embodiments described herein.
Figure 9:
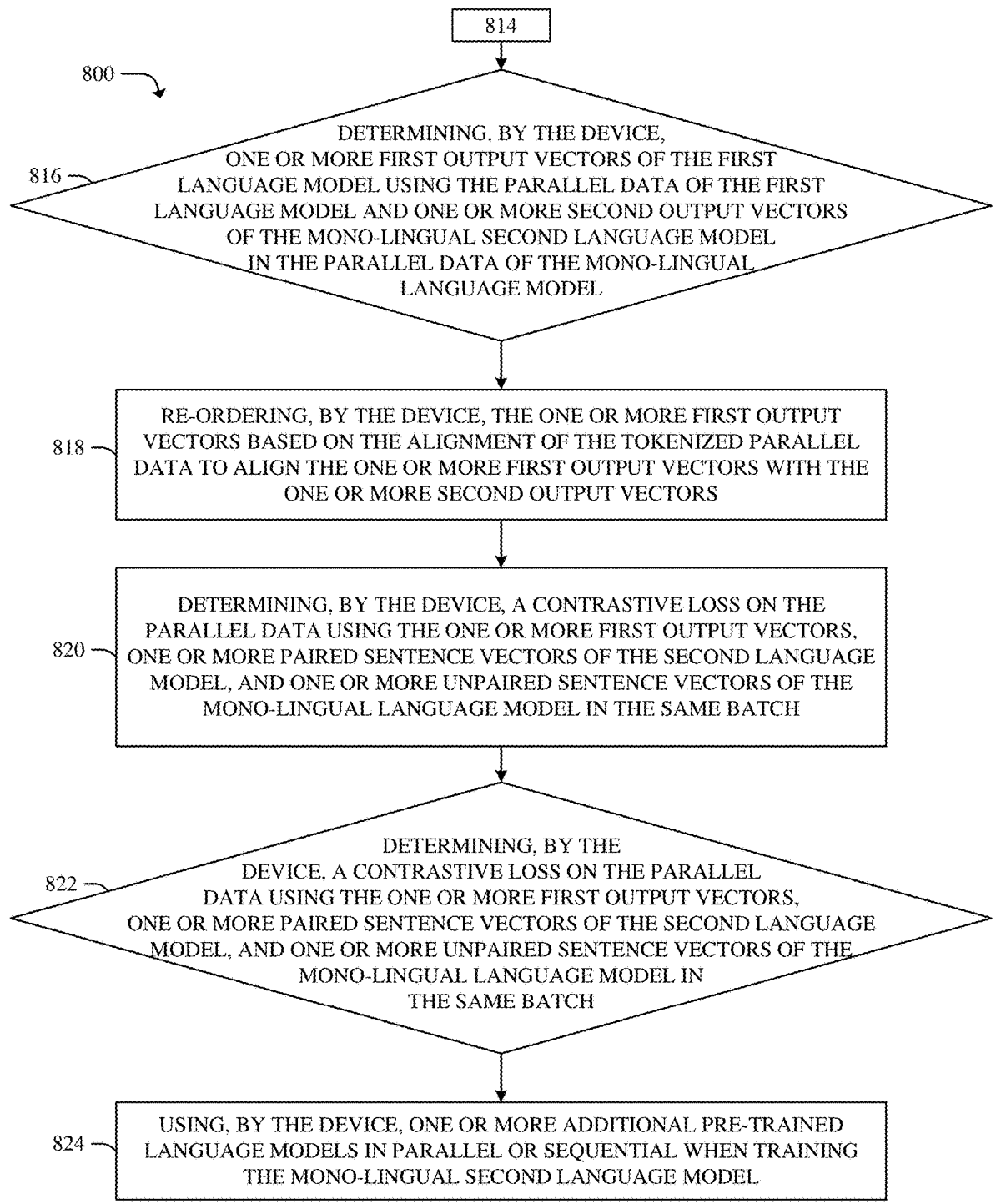
FIG. 9 illustrates a continued flow diagram of an example, non-limiting computer-implemented method that can facilitate improving a mono-lingual language model using pre-trained models and parallel data, in accordance with one or more embodiments described herein.

With embodiments, FIGS. 8 and 9 illustrate flow diagrams of an example, non-limiting computer-implemented method 800 that can facilitate improving a mono-lingual language model using pre-trained models and parallel data in accordance with one or more embodiments described herein. Repetitive descriptions of like elements and/or processes employed in respective embodiments is omitted for sake of brevity.

At 802, the computer implemented method 800 can comprise using, by a device (e.g., the training component 102, the data component 104, the tokenizing component 106, and the alignment component 108) operatively coupled to a processor, a first language model to improve a mono-lingual second language model.

At 804, the computer implemented method 800 can comprise collecting, by the device (e.g., the training component 102, the data component 104, the tokenizing component 106, and the alignment component 108), parallel data for the first language model and the mono-lingual second language model.

At 806, the computer implemented method 800 can comprise tokenizing, by the device (e.g., the training component 102, the data component 104, the tokenizing component 106, and the alignment component 108), the parallel data for the first language model and the mono-lingual second language model.

At 808, the computer implemented method 800 can comprise creating, by the device (e.g., the training component 102, the data component 104, the tokenizing component 106, and the alignment component 108), an alignment of the tokenized parallel data.

At 810, the computer implemented method 800 can comprise training, by the device (e.g., the training component 102, the data component 104, the tokenizing component 106 and the alignment component 108), to minimize the loss of the mono-lingual second language model via mask language modeling (MLM) training and contrastive learning.

At 812, the computer implemented method 800 can comprise determining, by the device (e.g., the training component 102, the data component 104, the tokenizing component 106, and the alignment component 108), a first MLM loss of the mono-lingual second language model using mono-lingual text data and a second MLM loss of the mono-lingual second language model using the parallel data for the mono-lingual second language model.

At 814, the computer implemented method 800 can comprise determining, by the device (e.g., the training component 102, the data component 104, the tokenizing component 106, and the alignment component 108), a contrastive loss on the parallel data.

At 816, the computer implemented method 800 can comprise determining, by the device (e.g., the training component 102, the data component 104, the tokenizing component 106, and the alignment component 108), one or more first output vectors of the first language model using the parallel data of the first language model and one or more second output vectors of the mono-lingual second language model in the parallel data of the mono-lingual language model.

At 818, the computer implemented method 800 can comprise reordering, by the device (e.g., the training component 102, the data component 104, the tokenizing component 106, and the alignment component 108), the one or more first output vectors based on the alignment of the tokenized parallel data to align the one or more first output vectors with the one or more second output vectors.

At 820, the computer implemented method 800 can comprise determining, by the device (e.g., the training component 102, the data component 104, the tokenizing component 106, and the alignment component 108), a contrastive loss on the parallel data using the one or more first output vectors, one or more paired sentence vectors of the second language model, and one or more unpaired sentence vectors of the mono-lingual language model in the same batch.

At 822, the computer implemented method 800 can comprise determining, by the device (e.g., the training component 102, the data component 104, the tokenizing component 106, and the alignment component 108), a contrastive loss on the parallel data using the one or more first output vectors, one or more paired sentence vectors of the second language model, and one or more unpaired sentence vectors of the mono-lingual language model in the same batch.

At 824, the computer implemented method 800 can comprise using, by the device (e.g., the training component 102, the data component 104, the tokenizing component 106, and the alignment component 108), one or more additional pre-trained language models in parallel or sequential when training the mono-lingual second language model.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. Additionally, the computer-implemented methodologies described hereinafter and throughout this specification are capable of being stored on an article of manufacture to enable transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively mitigate the prorogation of errors from the generative stage to the parser training stage as the one or more embodiments described herein can enable this process. And, neither can the human mind nor a human with pen and paper mitigate the propagation of errors from the generative stage to the parser training stage, as conducted by one or more embodiments described herein.

FIG. 10 illustrates a block diagram of an example, non-limiting operating environment 1000 in which one or more embodiments described herein can be facilitated. FIG. 10 and the following discussion are intended to provide a general description of a suitable operating environment 1000 in which one or more embodiments described herein at FIGS. 1-9 can be implemented.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1000 contains an example of an environment for the execution of at least some of the computer code involved in performing the inventive methods, such as mono-lingual model improvement code 1045. In addition to block 1045, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 1045, as identified above), peripheral device set 1014 (including user interface (UI), device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

COMPUTER 1001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method may be distributed among multiple computers and/or between multiple locations. On the other hand, in this presentation of computing environment 1000, detailed discussion is focused on a single computer, specifically computer 1001, to keep the presentation as simple as possible. Computer 1001 may be located in a cloud, even though it is not shown in a cloud in FIG. 10. On the other hand, computer 1001 is not required to be in a cloud except to any extent as may be affirmatively indicated.

PROCESSOR SET 1010 includes one, or more, computer processors of any type now known or to be developed in the future. Processing circuitry 1020 may be distributed over multiple packages, for example, multiple, coordinated integrated circuit chips. Processing circuitry 1020 may implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set may be located "off chip." In some computing environments, processor set 1010 may be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods may be stored in block 1045 in persistent storage 1013.

COMMUNICATION FABRIC 1011 is the signal conduction paths that allow the various components of computer 1001 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, the volatile memory is characterized by random access, but this is not required unless affirmatively indicated. In computer 1001, the volatile memory 1012 is located in a single package and is internal to computer 1001, but, alternatively or additionally, the volatile memory may be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 may be a read only memory (ROM), but typically at least a portion of the persistent storage allows writing of data, deletion of data and re-writing of data. Some familiar forms of persistent storage include magnetic disks and solid state storage devices. Operating system 1022 may take several forms, such as various known proprietary operating systems or open source Portable Operating System Interface type operating systems that employ a kernel. The code included in block 1045 typically includes at least some of the computer code involved in performing the inventive methods.

PERIPHERAL DEVICE SET 1014 includes the set of peripheral devices of computer 1001. Data communication connections between the peripheral devices and the other components of computer 1001 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1023 may include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 may be persistent and/or volatile. In some embodiments, storage 1024 may take the form of a quantum computing storage device for storing data in the form of qubits. In embodiments where computer 1001 is required to have a large amount of storage (for example, where computer 1001 locally stores and manages a large database) then this storage may be provided by peripheral storage devices designed for storing very large amounts of data, such as a storage area network (SAN) that is shared by multiple, geographically distributed computers. IoT sensor set 1025 is made up of sensors that can be used in Internet of Things applications. For example, one sensor may be a thermometer and another sensor may be a motion detector.

NETWORK MODULE 1015 is the collection of computer software, hardware, and firmware that allows computer 1001 to communicate with other computers through WAN 1002. Network module 1015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001), and may take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 may be a client device, such as thin client, heavy client, mainframe computer, desktop computer and so on.

REMOTE SERVER 1004 is any computer system that serves at least some data and/or functionality to computer 1001. Remote server 1004 may be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data may be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs may be stored as images and may be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware, and firmware that allows public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations.

That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:
    a processor that executes computer-executable components stored in a non-transitory computer-readable memory, wherein the computer-executable components comprise:
    a training component that uses a first language model to improve a mono-lingual second language model through mask language modeling (MLM) training and contrastive learning;
    a data component that collects parallel data for the first language model and the mono-lingual second language model;
    a tokenizing component that tokenizes the parallel data for the first language model and the mono-lingual second language model; and
    an alignment component that creates an alignment of the tokenized parallel data.

2. The system of claim 1, wherein the training component determines a first MLM loss of the mono-lingual second language model using mono-lingual text data and determines a second MLM loss of the mono-lingual second language model using the parallel data for the mono-lingual second language model.

3. The system of claim 1, wherein the training component determines a contrastive loss on the parallel data.

4. The system of claim 3, wherein the training component determines one or more first output vectors of the first language model using the parallel data of the first language model and one or more second output vectors of the mono-lingual second language model using the parallel data of the mono-lingual second language model.

5. The system of claim 4, wherein the training component re-orders the one or more first output vectors based on the alignment of the tokenized parallel data to align the one or more first output vectors with the one or more second output vectors.

6. The system of claim 5, wherein the training component determines the contrastive loss on the parallel data using the one or more first output vectors, one or more paired sentence vectors of the mono-lingual second language model, and one or more unpaired sentence vectors of the mono-lingual second language model in the same batch.

7. The system of claim 1, wherein one or more additional pre-trained language models are used in parallel or sequential when training the mono-lingual second language model.

8. The system of claim 1, wherein the first language model is either mono-lingual or multilingual.

9. A computer implemented method for improving a mono-lingual language model using pre-trained models and parallel data, the computer implemented method comprising:
   using, by a device operatively coupled to a processor, a first language model to improve a mono-lingual second language model;
   collecting, by the device, parallel data for the first language model and the mono-lingual second language model;
   tokenizing, by the device, the parallel data for the first language model and the mono-lingual second language model;
   creating, by the device, an alignment of the tokenized parallel data; and
   training, by the device, to minimize loss of the mono-lingual second language model via mask language modeling (MLM) training and contrastive learning.

10. The computer implemented method of claim 9, further comprising:
    determining, by the device, a first MLM loss of the mono-lingual second language model using mono-lingual text data; and
    determining, by the device, a second MLM loss of the mono-lingual second language model using the parallel data for the mono-lingual second language model.

11. The computer implemented method of claim 9, further comprising:
    determining, by the device, a contrastive loss on the parallel data; and
    determining, by the device, one or more first output vectors of the first language model using the parallel data of the first language model and one or more second output vectors of the mono-lingual second language model in the parallel data of the mono-lingual language model.

12. The computer implemented method of claim 11, further comprising:
    re-ordering, by the device, the one or more first output vectors based on the alignment of the tokenized parallel data to align the one or more first output vectors with the one or more second output vectors.

13. The computer implemented method of claim 12, further comprising:
    determining, by the device, the contrastive loss on the parallel data using the one or more first output vectors, one or more paired sentence vectors of the mono-lingual second language model, and one or more unpaired sentence vectors of the mono-lingual language model in the same batch.

14. The computer implemented method of claim 9, further comprising:
    using, by the device, one or more additional pre-trained language models in parallel or sequential when training the mono-lingual second language model; and
    wherein the first language model is either mono-lingual or multilingual.

15. A computer program product for improving a mono-lingual language model using pre-trained models and parallel data, the computer program product comprising a non-transitory computer readable memory having program instructions embodied therewith, the program instructions executable by a processor to cause the processor to:
    use a first language model to improve a mono-lingual second language model;
    collect parallel data for the first language model and the mono-lingual second language model;
    tokenize the parallel data for the first language model and the mono-lingual second language model;
    create an alignment of the tokenized parallel data; and
    train to minimize loss of the mono-lingual second language model via mask language modeling (MLM) training and contrastive learning.

16. The computer program product of claim 15, wherein the program instructions are further executable to cause the processor to:
    determine a first MLM loss of the mono-lingual second language model using mono-lingual text data; and
    determine a second MLM loss of the mono-lingual second language model using the parallel data for the mono-lingual second language model.

17. The computer program product of claim 15, wherein the program instructions are further executable to cause the processor to:
    determine a contrastive loss on the parallel data; and
    determine one or more first output vectors of the first language model using the parallel data of the first language model and one or more second output vectors of the mono-lingual second language model in the parallel data of the mono-lingual language model.

18. The computer program product of claim 17, wherein the program instructions are further executable to cause the processor to:
    re-order the one or more first output vectors based on the alignment of the tokenized parallel data to align the one or more first output vectors with the one or more second output vectors.

19. The computer program product of claim 18, wherein the program instructions are further executable to cause the processor to:
    determine the contrastive loss on the parallel data using the one or more first output vectors, one or more paired sentence vectors of the mono-lingual second language model, and one or more unpaired sentence vectors of the mono-lingual language model in the same batch.

20. The computer program product of claim 15, wherein the program instructions are further executable to cause the processor to:
    use one or more additional pre-trained language models in parallel or sequential when training the mono-lingual second language model; and
    wherein the first language model is either mono-lingual or multilingual.

* * * * *